United States Patent
Robinson

[15] 3,678,037
[45] July 18, 1972

[54] PROCESS FOR PRODUCING α-AMINO PENICILLIN INTERMEDIATES

[72] Inventor: Charles A. Robinson, West Chester, Pa.

[73] Assignee: American Home Products Corporation, New York, N.Y.

[22] Filed: Aug. 10, 1970

[21] Appl. No.: 62,682

Related U.S. Application Data

[63] Continuation-in-part of Ser. No. 4,161, Jan. 14, 1970, abandoned, Continuation of Ser. No. 671,938, Oct. 2, 1967, abandoned.

[52] U.S. Cl. ..........................................................260/239.1
[51] Int. Cl. .........................................................C07d 99/16
[58] Field of Search..............................................260/239.1

[56] References Cited

FOREIGN PATENTS OR APPLICATIONS 959,853   6/1964   Great Britain......................260/239.1

*Primary Examiner*—Nicholas S. Rizzo
*Attorney*—Andrew Kafko, Joseph Martin Weigman, Dwight J. Potter, Vito Victor Bellino and Robert Wiser

[57] ABSTRACT

A method for preparing organosilane derivatives of α-amino penicillins comprising preparation of an amine base salt of 6-aminopenicillanic acid by reacting the latter with a strong amine in an organic solvent devoid of hydroxyl groups; adding to the resulting mixture of the amine base salt of 6-aminopenicillanic acid, which has had added thereto a weak amine base, a mono- or multi-functional halosilane; incorporating a mineral acid salt of a weak amine in the mixture; and then adding to the last resulting mixture the chloride hydrochloride of a suitable α-amino acid to form by acylation the organosilane derivatives of the hydrochloride of the desired α-amino penicillin. The resulting silylated and silenated penicillin hydrochlorides are useful for conversion into the corresponding α-amino penicillin having potent antibiotic activity, by simple hydrolysis or alcoholysis, followed either by transformation of the resulting penicillin hydrochloride into an aryl sulfonic acid salt thereof which may be neutralized to the penicillin per se by addition of a suitable base, or by the raising of the pH of the reaction mixture to the iso-electric point to cause precipitation of the desired penicillin.

17 Claims, No Drawings

PROCESS FOR PRODUCING α-AMINO PENICILLIN INTERMEDIATES

This application is a continuation-in-part of my United States application Ser. No. 4,161 filed Jan. 14, 1970, as a continuation of my United States application Ser. No. 671,938, filed Oct. 2, 1967, and which has been allowed. Both said applications have since been abandoned.

BACKGROUND OF THE INVENTION

This invention relates generally to the preparation of α-amino penicillins having potent antibiotic activity, and more particularly to a novel process for preparing the silylated and silenated forms of certain α-amino penicillin hydrochlorides defined hereinafter, which are easily convertible to the desired α-amino penicillins per se by hydrolysis or alcoholysis, followed by transformation of the resulting penicillin hydrochloride into an aryl sulfonic acid salt thereof which may be neutralized to the penicillin per se by addition of a suitable base, or by the raising of the pH of the reaction mixture to the iso-electric point to cause precipitation of the desired penicillin.

The so-called "silyl" route to the production of penicillins is now generally known. For example, in U.S. Pat. No. 3,249,622 there is disclosed a process for preparing penicillins generally by said "silyl" route. However, the process therein disclosed is not particularly adapted to the preparation of α-amino penicillins. Moreover, for the preparation of silylated 6-amino-penicillianic acid, which is later to be acylated, the patent states a preference for hydrocarbons and ethers as solvents. There is no suggestion at all that other types of organic solvent devoid of hydroxyl groups may be advantageously substituted. Furthermore, in all the Examples given in the patent, in which trimethylchlorosilane is used as silylating agent, there is shown the use of benzene or toluene as solvent, and the need for reflux for 5 hours (at 80°–110°C) to form the silylated 6-aminopenicillanic acid.

In Glombitza, *Annalen* 673, 166(1964) there is disclosed the preparation of penicillins (similarly not including α-amino penicillins) by a "silyl" route using assilylating agent hexamethyldisilazane in chloroform. The use of hexamethyldisilazane for the preparation of silylated 6-aminopenicillanic acid has the disadvantage that the by-product ammonia formed in the reaction must be completely removed before proceeding to the acylation step.

In Irish Pat. No. 7463 (which matured from application No. 102/63), there is disclosed an extension of the silyl route to the preparation of α-amino penicillins. Therein, for the preliminary preparation of the requisite silylated 6-aminopenicillanic acid, preference is disclosed for heating 6-aminopenicillanic acid with more than two moles of N-trimethylsilyldiethylamine at 60°–170°C so that diethylamine distills off. Moreover, excess N-trimethylsilyldiethylamine must be removed by vacuum distillation and all by-product diethylamine must be absent for optimum results in the succeeding acylation stage. In using this preferred procedure of the patent, the highest yield of the α-aminobenzylpenicillin, ampicillin, reported to have been obtained is 57 percent (cf. Example 5 of the patent).

The Irish patent also discloses the preparation of the silylated 6-aminopenicillanic acid by use of trimethylchlorosilane with a sodium, potassium, or calcium salt of 6-aminopenicillanic acid in benzene, toluene, formamide, or dimethyl formamide, in the presence of a tertiary amine base. Such a process requires the additional preliminary step of preparing the salt of 6-aminopenicillanic acid for use as a starting material. In Example 2 of the patent, wherein this procedure is used, evaporation of the reaction mixture afforded very low yields (25–29 percent) of disilylated 6-aminopenicillanic acid.

DESCRIPTION OF THE INVENTION

With the foregoing disadvantages and shortcomings of the prior art in view, it is a primary object of the present invention to provide a practical method for preparing α-amino penicillins of the group defined hereinafter, in high yield from commercially available starting materials by a process employing mild reaction conditions and short reaction times, without the necessity for the removal of any by-products or the distillation of any solvents, and without the isolation of any intermediates.

In accordance with the present invention, the novel process of the invention is useful for preparing silylated and silenated α-amino penicillins of the group having any of the three following formulae respectively:

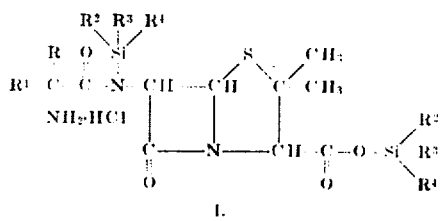

I.

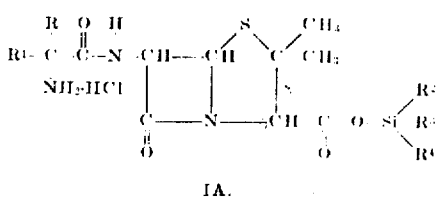

IA.

wherein: when R and $R^1$ are separate, R is hydrogen and $R^1$ is phenyl, and when R and $R^1$ are joined, they complete a moiety of the group consisting of (a) a cycloalkyl ring of from four to seven carbon atoms and (b) an indane ring; $R^2$, $R^3$ and $R^4$ are each selected from the group consisting of lower alkyl, aryl and aralkyl; and

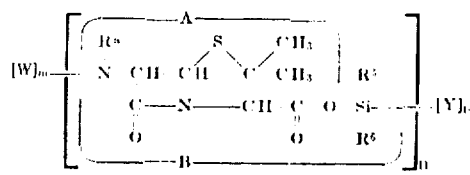

II wherein:

$R^5$ is of the group consisting of hydrogen, alkyl, aryl and aralkyl;

$R^6$ is of the group consisting of halogen, alkyl, aryl and aralkyl;

$R^n$ is of the group having the formula:

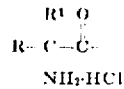

wherein R and $R^1$ have the same meaning as in Formula I; W is of the group consisting of hydrogen, and

wherein $R^5$ and $R^6$ have the same meaning as before, and X is halogen;

$m$ is an integer from 0 to 1;

$n$ is an integer from 1 to about 25;

$p$ is an integer from 0 to 1; and

Y is of the group consisting of halogen, and groups of the following formula:

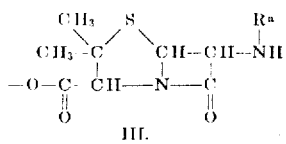

III.

wherein $R^a$ has the same meaning as before; with the provisos that, in formula II,
1. when $m$ is 0 and $p$ is 0, $n$ is more than 1;
2. when $n$ is more than 1, the moieties A of the additional groups B recur in random head-toward-head, head-toward-tail and tail-toward-tail disposition;
3. $m$ and $p$ are always equal.

In its broadest aspects, said method comprises (1) preparing a mixture of 6-aminopenicillanic acid and a strong amine and a weak amine in an organic solvent devoid of hydroxyl groups; (2) adding to said mixture a mono- or multi-functional halosilane to form a silylated or silenated derivative, respectively, of 6-aminopenicillanic acid; (3) incorporating in the mixture a mineral acid salt of a weak amine; and then (4) adding to the resulting mixture containing said derivative, an organic acid chloride hydrochloride of the group having the formula:

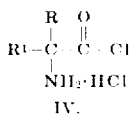

IV.

wherein R and $R^1$ have the same meaning as in formulae I and II above.

As will appear from the Examples set forth later on herein, there may be used, as silylating agents, those of the monofunctional variety, such as monohalosilanes; e.g., trimethylchlorosilane, tri-n-butylchlorosilane, diphenylmethylchlorosilane, triethylbromosilane and the like, to result in the monomeric disilylated compounds of formula I.; hexaalkyldisilazanes, such as hexamethyldisilazane; or trialkylsilyldialkylamine such as trimethylsilyldiethylamine and trimethylsilyldimethylamine to result in the monomeric disilylated or monosilylated compounds of formulae I. or IA., by utilizing a modified sequence of steps, as described hereinafter; and, as silenating agents; those of the multifunctional variety, such as dihalosilanes; e.g., dimethyldichlorosilane, methyl hydrogen dichlorosilane, methylpropyldichlorosilane, methylphenyldichlorosilane, dimethyldibromosilane, dibutyldichlorosilane, diphenyldichlorosilane, dibenzyldichlorosilane, ethylbenzyldibromosilane, and the like, and trihalosilanes, for example, methyltrichlorosilane, propyltrichlorosilane, and the like to result in the silenated compounds of formula II.

In a preferred embodiment of the process of the invention, in step (1) above, the organic solvent devoid of hydroxyl groups is selected from the group consisting of methylene chloride, chloroform, tetrahydrofuran, dimethyl formamide, and acetonitrile; the molar ratio of the strong amine per mole of 6-aminopenicillanic acid is in a range of from 1.1 to 2.5 moles, and that of the weak amine is in the range of 0.75 to 1.25 moles per mole of 6-aminopenicillanic acid. In step (2), there is added slowly to the said mixture a monofunctional halosilane until the molar ratio of said silane is in the range of from 1 to 2 moles per mole of 6-aminopenicillanic acid, or a multi-functional halosilane until the molar ratio of said silane is in the range of 0.5 to 1.5 moles per mole of 6-aminopenicillanic acid, with the molar amount of said strong amino at least equal to the molar amount of said halosilane, to form the silylated or silenated 6-aminopenicillanic acid, respectively. The reaction is continued at a temperature at which the reaction proceeds to completion in a reasonably short time, for example, 1 to 2 hours at 30°-45°C.

Other organic solvents devoid of hydroxyl groups instead of those preferred, may be substituted as desired. For example, the process of the invention may be exercised with such solvents as ethyl acetate, ethylene dichloride, benzene, toluene, ethyl ether, methylisobutylketone, and the like, or a mixture thereof which may or may not include one or more of the preferred solvents.

In step (3), the weak amine acid addition salt is incorporated in the reaction mixture to furnish mineral acid at least in molar concentration equivalent to the molar concentration of strong amine present in excess of that consumed in the sylylation or silenation reaction; and then in step (4), the organic acid chloride hydrochloride of formula IV above is added slowly to provide a molar ratio of 0.75 to 1.25 per mole of 6-aminopenicillanic acid.

An alternative, and equally satisfactory means of carrying out step (3) of the method of the invention is the inactivation of the "strong amine" and the formation of "weak amine" and hydrochloride, in situ, by passing anhydrous hydrogen chloride into the reaction mixture containing excess "weak amine".

As used herein, the "strong amines" include ammonia and those aliphatic secondary and tertiary amines, which may be straight or branched chain, saturated or unsaturated, symmetrical or unsymmetrical, and are characterized by having dissociation constants in the range of from $10^{-3}$ to $10^{-6}$, or having comparable basicity, as distinguished from "weak amines" which are characterized by having dissociation constants in the range of from $10^{-8}$ to $10^{-11}$.

As disclosed in copending U.S. application Ser. No. 671,951, "Process for Producing $\alpha$-Amino Penicillins", C.A. Robinson and J.J. Nescio, filed Oct. 2, 1967 and granted Nov. 11, 1969, as U.S. Pat. No. 3,478,018; in the reaction of 6-APA with the strong amine in the selected solvent to form the amine salt of 6-APA, for example, in the preparation of disilylated $\alpha$-aminobenzyl penicillin hydrochloride with the ultimate view of obtaining ampicillin, results have been obtained with the use of various alkyl amines as given in Table A below:

TABLE A

| Amine | Dissociation Constant | Overall Yield of Ampicillin |
|---|---|---|
| Triethylamine | $5.6 \times 10^{-4}$ | 78% |
| Diethylamine | $1.3 \times 10^{-4}$ | 79% |
| Amberlite XE-204 | | 66% |
| Amberlite LA-2 | | 54% |
| Tri-n-octylamine | | 63% |
| Tri-n-decylamine | | |

Additionally, the use of any of trihexylamine, diisohexylamine, 2,2-diethyldihexylamine, Amberlite LA-1 (an aliphatic unsymmetrical branched chain unsaturated secondary amine) and ammonia has resulted in overall yields of ampicillin anhydrous above 65 percent. Amberlite LA-2 listed in Table A above is similar to Amberlite LA-1 except that the former is saturated. Amberlite XE-204 is generally similar to Amberlite LA-2 except that it is tertiary amine.

As is also disclosed in said copending U.S. application Ser. No. 671,951, it has been found that, for obtaining the maximum yield of ultimate product, the amount of strong amine in the reaction is preferably limited to no more than substantially one mole per mole of the monofunctional chlorosilane used, as shown in Table B below:

TABLE B

| % Excess Triethylamine | Overall yield of Ampicillin |
|---|---|
| 0 | 78% |
| 10 | 68% |
| 15 | 58% |
| % Excess Diethylamine | |
| 0 | 79% |

As further described in U.S. application Ser. No. 671,951, with respect to the addition of tri(lower)alkylchlorosilane to form the silylated 6–APA in step (2), theoretically, from 1 to 2 moles of tri(lower)alkylchlorosilane per mole of 6–APA can be used to give mono- or disilylated 6–APA or mixtures of mono- and disilylated 6–APA. However, in using 1.1 mole of the trimethylchlorosilane per mole of 6–APA; the overall yield when ampicillin was being prepared, was 50 percent compared to a yield of 79 percent when 2.0 moles of the silane per mole of 6–APA was used in comparable runs.

As appears from the foregoing, and particularly Table B; in the process for preparing α-amino penicillins by the improved silyl route described in said U.S. Ser. No. 671,951, it is essential for optimum yield to use an exact amount of strong base in the preparation of silylated 6–APA from trimethylchlorosilane so that none remains to interfere in the reaction with the acid chloride hydrochloride in the acylation step. Similarly, in preparing silylated 6–APA from hexamethyldisilazane or N-trimethylsilyl-dialkylamine, in accordance with the prior art methods referred to hereinbefore, the resulting by-product ammonia or dialkylamine, respectively, must be completely removed prior to the next step.

The present invention provides a unique method for the inactivation of any strong amine which may be present as a result of incomplete usage, inaccurate measurement, or the use of an excess in exercising the general method described in U.S. Ser. No. 671,951. By affording a means of inactivating excess strong amine, the new procedure described hereinafter allows an excess of the strong amine to be employed in the preceding step to ensure maximum yield and subsequently to be rendered harmless. In this connection, the use of an amount of strong amine even in excess of 2½ moles per mole of 6–APA is not deleterious, if such excess is inactivated according to the process of this invention. However, such higher excess offers no significant advantage and hence may preferably be avoided because of economical considerations.

More specifically, the invention comprises the inclusion of the step of incorporating a mineral acid salt of a weak amine in the reaction mixture prior to the addition of the organic acid chloride hydrochloride thereto. In this way, the excess strong amine is converted into its mineral acid salt which does not interfere in subsequent reactions and the mineral acid salt of the weak base is converted into its weak base form which is required in the subsequent reaction and is known to be harmless if present in excess. The amount of mineral acid salt of the weak base to be added need not be exact since any excess employed is not harmful. Thus, remarkably, neither the reagent nor any of its reaction products with the strong amine interfere in the subsequent reaction of silylated 6–APA with an acid chloride hydrochloride.

With disilyl 6–APA reaction mixtures prepared from 1.0 mole 6–APA, 2.0 moles trimethylchlorosilane, and the amounts of strong bases listed below, the addition of various mineral acid salts of weak amine prior to treatment with 1.0 mole of D(-phenylglycyl chloride hydrochloride had the beneficial effects on the yield of ampicillin, for example, as illustrated in Table C below:

TABLE C

| Strong Base Moles | Additive | Moles | Overall yield of Ampicillin |
|---|---|---|---|
| Triethylamine 2.5 | None | — | 58% |
| Triethylamine 2.5 | Dimethylaniline · 2HCl | 0.30 | 83% |
| Triethylamine 2.15 | Dimethylaniline · 2HCl | 0.10 | 84% |
| Triethylamine 2.0 | Dimethylaniline · 2HCl | 0.07 | 86% |
| Triethylamine 2.1 | Anhydrous HCl | 0.20 | 83% |
| Diethylamine 2.7 | None | — | 59% |
| Diethylamine 2.2 | Dimethylaniline · 2HCl | 0.20 | 81% |
| Diethylamine 2.2 | Pyridine · HCl | 0.40 | 78% |
| Trihexylamine 2.0 | Dimethylaniline · 2HCl | 0.05 | 77% |
| Triethylamine 2.15 | Dimethylaniline HCl | 0.20 | 82% |
| Triethylamine 2.1 | Dimethylaniline H₂SO₄ | 0.11 | 86% |
| Triethylamine 2.1 | Pyridine HNO₃ | 0.14 | 86% |

Other weak amine hydrochlorides such as quinoline hydrochloride, and other salts such as sulfates and nitrates are also suitable as exemplified above in Table C. As noted, the mono acid salts of weak amines may be used as well as the di acid salts thereof as available and desired. Since the mineral acid salts of the weak bases are often hygroscopic, they are conveniently added as solutions in methylene chloride. The strength of the solution is determined by titration.

In the addition of the organic acid chloride hydrochloride to the reaction mixture (step (4)) in the presence of at least a molar equivalent of a weak tertiary amine as proton acceptor, the amount of said acid chloride hydrochloride used is preferably substantially equimolar with the 6–APA used as starting material. The acid chloride hydrochloride is preferably added portionwise under low temperature conditions, optimally at 10°C. or lower for better yields. As will also be apparent to those skilled in the art, the phenyl, cycloalkyl or indane ring moieties of the acylating agents may have substituents thereon as desired, such as lower alkyl, lower alkoxy, halo, nitro, and the like. The ultimate penicillins are obtained by hydrolysis or alcoholysis of these acylated derivatives to the penicillin per se.

Upon completion of addition of the organic acid chloride hydrochloride to the reaction mixture, subsequent reaction at 0°–25C. (for 15 minutes to three hours) or at from 18°–20°C. (for one-half hour) has been found to be adequate. On the other hand, continued reaction for as long as 21 hours at 10°C. is not seriously deleterious to the yield.

Although the weak amine base may be added for convenience in step (1), it can equally be added at any time prior to the addition of the acid chloride hydrochloride in step (4). For this purpose, any weak tertiary amine such as dimethylaniline, pyridine, quinoline or 2,6-lutidine can be employed, whereas stronger amines such as N-ethylmorpholine are deleterious, as exemplified in Table D below:

TABLE D

| Weak Base | Dissociation Constant | Overall yield of Ampicillin |
|---|---|---|
| N,N-dimethylaniline | $3.8 \times 10^{-10}$ | 85% |
| Pyridine | $1.7 \times 10^{-9}$ | 79% |
| N-ethylmorpholine | $5 \times 10^{-7}$ | 15% |

By the term weak amine, as also referred to hereinbefore, is meant those amines having dissociation constants in the range of from $10^{-8}$ to $10^{-11}$.

In this connection, it is noted that the use of even as much as a 50 percent excess of the weak amine has no adverse effect on the yield of the disilylated 6–APA, and hence, on the ultimate yield of the penicillin desired.

Given below is a schematic representation of the steps (1) to (4) described above as they relate to the process wherein a monofunctional silane; e.g., trimethylchlorosilane is used as silylating agent:

SCHEMATIC REPRESENTATION I (1) 6-APA plus strong amine ———→ (6-APA·amine salt)

(2) (6-APA·amine salt) plus 2(CH₃)₃SiCl plus strong amine ———→ disilyl 6-APA plus 2 (strong amine·HCl)

(3) Strong amine plus mineral acid salt of weak amine ———→ mineral acid salt of strong amine plus weakamine (4)

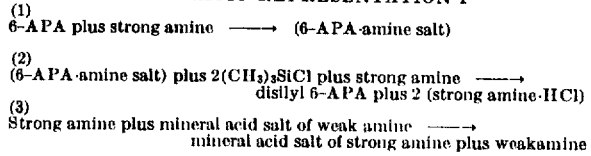

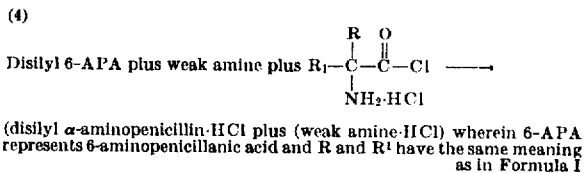

(disilyl α-aminopenicillin·HCl plus (weak amine·HCl) wherein 6-APA represents 6-aminopenicillanic acid and R and R¹ have the same meaning as in Formula I In the silenation of 6-aminopenicillanic acid, various proportions of di- and tri-halosilanes and acid acceptors can be employed to give various novel silenated products which contain a half to two silicon groups per APA group, and in which one or two of the halogen atoms of the di- or tri-halosilane have reacted. For example, the reactions set forth in "Schematic Representations II" which follows, wherein P =

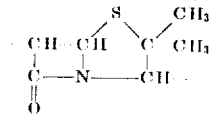

are considered to be involved:

SCHEMATIC REPRESENTATIONS II (1)
6-APA plus R⁵R⁶SiX₂ plus base (acid acceptor) ——→

$$NH_2-P-\overset{O}{\overset{\|}{C}}O-\overset{R^5}{\underset{R^6}{\overset{|}{Si}}}X \text{ plus base } HX$$

(2)
6-APA plus 2 R⁵R⁶SiX₂ plus 2 base ——→

$$X\overset{R^5}{\underset{R^6}{\overset{|}{Si}}}N-P-\overset{O}{\overset{\|}{C}}O-\overset{R^5}{\underset{R^6}{\overset{|}{Si}}}X \text{ plus 2 base } HX$$

(3)
2(6-APA) plus R⁵R⁶SiX₂ plus 2 base ——→

$$NH_2-P-\overset{O}{\overset{\|}{C}}O-\overset{R^5}{\underset{R^6}{\overset{|}{Si}}}O\overset{O}{\overset{\|}{C}}-P-NH_2 \text{ plus 2 base } HX$$

(4)
6-APA plus R⁵R⁶SIX₂ plus 2 base ——→

$$\left[-\overset{H}{\underset{}{N}}-P-\overset{O}{\overset{\|}{C}}O-\overset{R^5}{\underset{R^6}{\overset{|}{Si}}}-\right]_n \text{ plus 2 base } HX$$

(5)
2(6-APA) plus 2 R₅R₆SIX₂ plus 4 base ——→

$$\left[-\overset{H}{\underset{}{N}}-P-\overset{O}{\overset{\|}{C}}O-\overset{R^5}{\underset{R^6}{\overset{|}{Si}}}O\overset{O}{\overset{\|}{C}}-P-\overset{H}{\underset{}{N}}-\overset{R^6}{\underset{R^6}{\overset{|}{Si}}}-\right]_n \text{ plus 4 base } HX$$

wherein 6-APA represents 6-aminopenicillanic acid, and X, R⁵ and R⁶ have the same meaning as in Formula II The products containing more than one "P" unit (i.e., wherein n => 1 in the foregoing formulae) are considered to be linear or cyclic dimers, trimers and the like, or polymers. In such cases, the repeating APA moieties of the group units may be randomly disposed head-toward-tail, head-toward-head and/or tail-toward-tail in a given compound, as will be understood by those skilled in the art and referred to hereinbefore.

Although the products of formula II have been prepared successfully using one-half to two moles of halosilane. per mole of 6-APA, it is preferred for maximum efficiency to use approximately equimolar proportions. Suitable acid acceptors include ammonia, organic amines, alkali metal carbonates, alkaline earth metal carbonates and the like. In general, it is preferred to use about two moles of anhydrous ammonia or an amine, such as triethylamine or diethylamine, per mole of halosilane.

For use as solvent media in the silenation of 6-APA, a wide range of anhydrous non-hydroxylic organic solvents are suitable, including hydrocarbons, such as benzene and toluene; chlorinated solvents such as methylene chloride, chloroform, ethylene dichloride and chlorobenzene; ethers such as diethyl ether, dioxane and tetrahydrofuran; and other conventional solvents such as methylisobutylketone, dimethylformamide, ethyl acetate and acetonitrile, as already referred to hereinbefore in connection with the silylation of 6-APA.

Among these solvents, methylene chloride, chloroform, acetonitrile, and ethyl acetate are particularly useful. Since the halosilanes and the silenated products are decomposed by moisture and other hydroxylic agents, solvents employed as reaction media must be substantially anhydrous and free from alcoholic impurities. Although more than 30 ml. of solvent per g. of APA has been used successfully for the silenation reaction, the use of 10 ml. per g. is usually sufficient. In some instances, however, the use of high dilution will favor intramolecular reaction and silenated derivatives of lower molecular weight, while a high concentration of reactants will favor intermolecular reaction and higher molecular weight products.

In the modified procedure for preparing silylated α-aminopenicillins of formula I and IA, wherein a hexaalkyldisilazane or a trialkylsilyldialkylamine is used as silylating agent, the method of the invention then comprises (a) preparing a mixture of 6-aminopenicillanic acid and a hexaalkyldisilazane or a trialkylsilyldialkylamine in an organic solvent devoid of hydroxyl groups, (b) heating said mixture until silylation is complete, (c) incorporating in the mixture a weak amine, (d) adding to the resulting mixture a mineral acid salt of a weak amine to inactivate the by-product alkylamine or ammonia present, and (e) treating the mixture containing the silylated 6-aminopenicillanic acid with an organic acid chloride hydrochloride of the group having the formula IV.

In a preferred embodiment of this procedure, in step (a) above, the organic solvent devoid of hydroxyl groups is selected from the group consisting of methylene chloride and chloroform; the molar amount of trialkylsilyldialkylamine is in the range of from 1 to 2.2 moles per mole of 6-APA or the hexaalkyldisilazane is in the range of from 0.6 to 1.0 mole per mole of 6-APA. Although trimethylsilyldiethylamine and hexamethyldisilazane are preferred for reasons of economy, other silylating agents such as trimethylsilyldimethylamine, triethylsilyldiethylamine, methyldiethyldisilazane, triethyldisilazane, etc., are suitable. With trialkylsilyldialkylamines, disilylation takes place readily to form ultimately silylated α-aminopenicillins of formula I, while with hexaalkyldisiliazanes, monosilylation may be the principal reaction to form monosilylated α-aminopenicillins of formula IA or mixtures of mono- and di-silylated products of formula I and IA.

In step (b) above, the mixture is heated until mono- or di-silylation is complete, for example, for 1–2 hours at the reflux temperature of methylene chloride. When using hexaalkyldisilazanes, ammonia is evolved during this period. In using trialkylsilyldialkylamines, optionally some of the dialkylamine formed in the reaction can be distilled off with solvent during the reaction period. In step (c), the molar ratio of weak amine is in the range of 0.75 to 1.25 moles per mole of 6-APA.

In step (d) above, the mineral acid salt of a weak amine is added to the reaction mixture to furnish mineral acid at least in molar concentration equal to the amount of dialkylamine or ammonia formed as a by-product in the silylation reaction and not lost by evolution or distillation during the reaction. In step (e), the organic acid chloride hydrochloride of formula IV is added to provide a molar concentration of from 0.75 to 1.25 mole per mole of 6-APA.

In the reaction of 6-APA with two molar proportions of trimethylsilyldiethylamine in methylene chloride at reflux for 2 hours, during which time 35 percent of the by-product diethylamine was distilled off, subsequent acylation with D(-)phenylglycyl chloride hydrochloride in the presence of N,N-dimethylaniline as acid acceptor afforded a 32 percent yield of ampicillin anhydrous. In an identical experiment in which the residual 65 percent of the diethylamine formed in the silylation reaction was inactivated by the addition of N,N-dimethylaniline dihydrochloride prior to acylation, the yield of ampicillin was 80 percent of theory. Even without the removal of any of the by-product strong amine by distillation, the addition of one equivalent of N,N-dimethylaniline dihydrochloride per mole of silylating agent afforded an 82 percent yield.

In the overall procedure in which the silylated or silenated penicillin hydrochloride compounds formed in accordance with the invention are then used to obtain the ultimate penicillin, said silylated or silenated penicillin hydrochloride compounds are added to water to remove the silane groups, thereby to result in the monomeric forms of said ultimate penicillin, regardless of whether a mono- or multifunctional compound has been used as silylating or silenating agent. In this step, the α-aminopenicillin hydrochloride can be completely removed from the organic solvent reaction mixture by extraction with cold water.

In the event the ultimate penicillin to be obtained is α-aminobenzyl penicillin (ampicillin), it has been found advantageous to change the chloride to an aryl sulfonic acid salt of the aminopenicillin, either by adding an appropriate sulfonic acid to the reaction mixture comprising the selected organic solvent and water, or to the aqueous extracts separated as described immediately above. In this connection a 25 percent excess of the sulfonic acid has been used to advantage in preparing the corresponding salt of ampicillin.

The aryl sulfonic salt of the α-aminobenzyl penicillin may then be converted to the penicillin per se by reaction with a base such as triethylamine or diethylamine in approximately 85 percent isopropanol. In the case of ampicillin specifically, the sulfonic acid salt, wet with water and ethyl acetate, may be added to isopropanol containing a molar equivalent of triethylamine at 75°–80°C., whereby the anhydrous form of ampicillin described and claimed in U.S. Pat. No. 3,144,445 is formed and collected by filtration from the hot mixture.

Alternatively, the corresponding penicillin may be obtained, but in hydrated form, by raising the pH of the aqueous reaction mixture containing the hydrochloride salt of said penicillin to the iso-electric point.

The subsequent steps in the production of the α-amino penicillin per se from the silylated amino penicillin hydrochloride is represented in "Schematic Representation III" below with reference specifically to the production of ampicillin wherein a monofunctional chlorosilane is used as silylating agent:

SCHEMATIC REPRESENTATION III

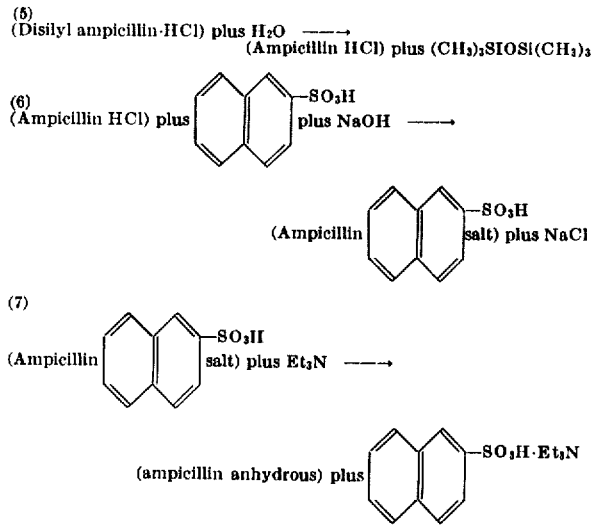

It will again be understood that, instead of the disilylated ampicillin HCl given in the foregoing "Schematic Representation III", a silenated compound of formula II may be used The following examples are illustrative of the invention and should not be considered as necessarily limitative thereof:

EXAMPLE 1

PREPARATION OF ANHYDROUS AMPICILLIN

A. To a mixture of 43.2 g. (0.20 mole) of 6-aminopenicillanic acid and 450 ml. of methylene chloride in a 1 L. 3-neck flask fitted with stirrer, thermometer, nitrogen inlet tube, and reflux condenser with drying tube, 50.5 g. (0.50 mole) of triethylamine and 26.7 g. (0.22 mole) of N,N-dimethylaniline were added. After refluxing for 1 hour, the turbid solution was cooled and 43.4 g. (0.40 mole) of trimethylchlorosilane was added dropwise over 7 minutes at 12°–15°C.

B. The mixture was allowed to reflux for 45 minutes and cooled under nitrogen to 20°C. Then 85 ml. of a 0.70 molar solution of dimethylaniline dihydrochloride in methylene chloride was added. After cooling the mixture, 41.3 g. (0.20 mole) of D(-)phenylglycyl chloride hydrochloride was added portionwise over 20 minutes at −10°C. The reaction mixture was allowed to stir at −10°C. for one-half hour and then warmed to 10°C. over one-half hour.

C. The reaction mixture was poured into 900 ml. of cold water with stirring and the aqueous layer decanted. The methylene chloride layer was re-extracted twice with 900 ml. of cold water, each time adjusting the mixture to pH 1.8–2.0 with dilute hydrochloric acid.

D. After clarifying the aqueous mixture by filtration, 150 ml. of ethyl acetate was added, followed by the dropwise addition of a solution of β-naphthalene sulfonic acid containing 52 g. (0.25 mole) of active agent and the concurrent addition of dilute sodium hydroxide to maintain a pH of 1.5–1.8. After stirring overnight at 2°–5°C, the white, crystalline naphthalene sulfonic acid salt of ampicillin was collected by filtration, washed thoroughly with cold water and finally with ethyl acetate. A sample dried in a vacuum oven at 50°–60°C. showed the wet filter cake (177 g.) to contain 58.5 percent solids.

E. The wet filter cake was added to a solution of 215 ml. of isopropanol and 19.5 g. of triethylamine at 75°–80°C. with rapid stirring and then allowed to stir for 15 minutes. The white, crystalline ampicillin anhydrous was filtered from the hot reaction mixture, washed with 85 percent aqueous isopropanol, and dried at 45°C; yield 58 g. or 83 percent of theory from 6-aminopenicillanic acid; iodometric assay, 969 mcg. per mg.; bioassay, 973 mcg./mg.

EXAMPLE 2

The procedure of Example 1 was followed except that the addition if dimethylaniline dihydrochloride was omitted; yield of ampicillin anhydrous, 40.5 g. or 58 percent of theory.

EXAMPLE 3

A. To 43.2 g. of 6-APA and 425 ml. of methylene chloride in a 1 L. 3-neck flask fitted with stirrer, thermometer, nitrogen inlet, and drying tube, 43.4 g. (0.43 mole) of triethylamine of 26.7 g. of N,N-dimethylaniline are added. The mixture is cooled and 43.4 g. of trimethylchlorosilane is added dropwise at 10°–15°C.

B. After refluxing for one hour, the mixture is cooled to 20°C, and 25 ml. of a 1.6 molar solution of N,N-dimethylaniline mono hydrochloride in methylene chloride is added. D(-)phenylglycyl chloride HCl (41.3 g.) is then added portionwise over 20 minutes at −10°C.

C. Completion of reaction, isolation of an aryl sulfonic acid salt and conversion to ampicillin anhydrous as described in Example 1, C–E, affords 57.3 or 82 percent of theory based on 6-APA. Bioassay, 947 mcg./mg.

EXAMPLE 4

A. To 173 g. (0.80 mole) of 6-APA and 1,700 ml. of methylene chloride in a 5 L. 3-neck flask fitted with stirrer thermometer, nitrogen inlet, and drying tube, 170 g. (1.68 moles) of triethylamine and 116 g. (0.96 mole) of N,N-dimethylaniline are added. After cooling the mixture, 174 g.

(1.6 moles) of trimethylchlorosilane is added slowly at 12°–15°C.

B. The mixture is refluxed for 1 hour and then cooled to 15°C. Anhydrous HCl (5.8 g.; 0.16 mole) is passed into the reaction mixture at 15°–20°C. After cooling, 165 g. (0.80 mole) of D(-)phenylglycycl chloride HCl is added portionwise at −5 to −10°C. over 20 minutes.

C. Completion of reaction, isolation of an aryl sulfonic acid salt and conversion to ampicillin anhydrous analogous to the procedure described in Example 1, C–E, affords 231 g. or 82.6 percent of theory from 6–APA. Bioassay, 940 mcg./mg.

EXAMPLE 5

The process of Example 4 was followed, except that 89 ml. of a 1.8N solution of dimethylaniline ·2HCl was substituted for the anhydrous HCl The yield of anhydrous ampicillin was 238 g. or 85 percent of from 6–APA; iodometric assay, 992 mcg./mg.

EXAMPLE 6

A. To a mixture of 43.2 g. (0.20 mole) of 6-aminopenicillanic acid and 450 ml. of methylene chloride in a 1 L. 3-neck flask fitted with stirrer, thermometer, nitrogen inlet tube, and reflux condenser with drying tube, 40.5 g. (0.40 mole) of triethylamine and 26.7 g. (0.22 mole) of N,N-dimethylaniline were added. The solution was cooled and 43.4 g. (0.40 mole) of trimethylchlorosilane was added dropwise over 7 minutes at 12°–15°C.

B. The mixture was allowed to reflux for one hour and cooled under nitrogen to 20°C. Then 6 ml. of a 3.35 N solution of dimethylaniline dihydrochloride in methylene chloride was added. After cooling the mixture, 41.3 g. (0.20 mole) of D(-)phenylglycycl chloride hydrochloride was added portionwise over 20 minutes at −10°C. The reaction mixture was allowed to stir at −10°C. for one-half hour and then warmed to 10°C. over one-half hour.

C. The reaction mixture was poured into 1200 ml. of cold water and then the procedure of Example 1, D and E was followed. Anhydrous ampicillin was obtained in 86 percent yield based on 6–APA; bioassay,973 mcg./mg.

EXAMPLE 7

Utilizing the procedure of Example 6, the following organic solvents were substituted for methylene chloride to obtain yields of anhydrous ampicillin as given in Table E below:

TABLE E

| Solvent | Yield of Anhydrous Ampicillin |
| --- | --- |
| Acetonitrile | 75% |
| Chloroform | 80% |
| Tetrahydrofuran | 76% |
| Ethyl Acetate | 53% |
| Dimethyl Formamide | 63% |

EXAMPLE 8

PREPARATION OF 1-AMINOCYCLOHEXANE PENICILLIN DIHYDRATE

To 54.0 g. (0.25 mole) of 6–APA and 1100 ml. of methylene chloride, 100 g. (0.41 mole) of di-n-octylamine, 17.1 g. (0.17 mole) of triethylamine, and 31.8 g. (0.26 mole) of N,N-dimethylaniline were added. The mixture was cooled under dry nitrogen and 54.3 g. (0.50 mole) of trimethylchlorosilane was added dropwise at 10°–15°C.

After heating at 40°C. for 1 hour, the mixture was cooled and 30 ml. of a 1.6 molar solution of N,N-dimethylaniline dihydrochloride in methylene chloride was added. Then 51.6 g. of 1-amino-1-cyclohexanecarboxylic acid chloride hydrochloride was added portionwise at 10°C. over 20 minutes. Reaction was completed by warming to 20°C. and stirring for 1 hour.

The mixture was poured into 400 ml. of ice-water with stirring and the two-phase mixture clarified by filtration. After separating layers, the methylene chloride layer was extracted with 50 ml. of water. Isopropyl alcohol (400 ml.) was added to the combined aqueous layers, and the pH adjusted to 5.4 with dilute sodium hydroxide. After stirring for 16 hours at 20°C., the crystalline product was collected by filtration, washed with acetone, and dried at 45°C. The yield of 6-(1-aminocyclohexanecarboxamido) penicillanic acid dihydrate was 77.0 g. or 82 percent of theory.

Following the same procedure except omitting the addition of dimethylaniline dihydrochloride, the yield was 71.4 g. or 76 percent of theory.

EXAMPLE 9

Employing the procedure of Example 8, but substituting for the 1-amino-1-cyclohexane carboxylic acid chloride hydrochloride used therein; the acid chloride hydrochlorides given in Table F below, the corresponding penicillins, which are disclosed per se in U.S. Pat. No. 3,194,802, are obtained.

TABLE F

Carboxylic Acid Chloride Hydrochloride

---

1-amino-1-cyclobutane
1-amino-1-cyclopentane
1-amino-1-cycloheptane

---

EXAMPLE 10

PREPARATION OF 2-AMINOINDANE PENICILLIN

To 54.0 g. of 6–APA and 530 ml. of methylene chloride, 53.2 g. (0.525 mole) of triethylamine and 33.9 g. (0.28 mole) of N,N-dimethylaniline were added. The mixture was cooled under dry nitrogen and 54.3 g. of trimethylchlorosilane was added over 10 minutes.

After heating at reflux for one hour with stirring, the mixture was cooled and 15 ml. of a 1.6 molar solution of N,N-dimethylaniline dihydrochloride in methylene chloride was added. The mixture was filtered under dry nitrogen and the filter cake washed twice with methylene chloride. Then, 61.0 g. of 2-amino-2-carboxyindane acid chloride hydrochloride was added portionwise at 0°C. over 20 minutes. After an additional 15 minutes at 0°C., the solution was warmed to 20 C. and stirred for 15 minutes at 20°C.

The mixture was poured into 650 ml. of cold water with stirring, clarified by filtration, and neutralized to pH 5.8 with dilute alkali. After stirring for 16 hours at 0°–5°C., the product was collected by filtration, washed with water and acetone, and dried at 45°C. The yield of 6-(2-amino-2-indanecarboxyamido) penicillanic acid was 82.0 g. or 87 percent of theory; purity by iodometric assay, 98 percent.

EXAMPLE 11

Following the procedure of Example 6, 108 g. (0.40 mole) of tri-isohexylamine was substituted for triethylamine. The yield of ampicillin anhydrous was 77 percent of theory; iodometric assay, 986 mcg. per mg.

EXAMPLE 12

Following the procedure of Example 6, 32.1 g. (0.44 mole) of diethylamine was substituted for triethylamine and 9.2 g. of pyridine hydrochloride in methylene chloride was substituted for the dimethylaniline dihydrochloride; yield, 78 percent of theory; bioassay, 970 mcg. per mg.

EXAMPLE 13

Utilizing the procedure of Example 6, dimethyldichlorosilane (25.8 g.; 0.20 mole) was substituted for the trimethylchlorosilane, the amount of triethylamine was increased to 46.5 g., and 13 ml. of 1.6 molar solution of dimethylaniline dihydrochloride was used. The yield of ampicillin anhydrous was 58.0 g. or 83 percent of theory; bioassay, 953 cg. per mg.

Following the same procedure except omitting the addition of N,N-dimethylaniline dihydrochloride, the yield was 70 percent of theory.

EXAMPLE 14

To 580 ml. of methylene chloride containing 0.43 mole of anhydrous ammonia, 43.2 g. of 6-APA and 26.7 g. of N,N-dimethylaniline were added followed by the dropwise addition of 25.8 g. of dimethyldichlorosilane at 12°C. After refluxing gently for 1 hour, the mixture was cooled to 10°C. under dry nitrogen and 13 ml. of 1.6 molar solution of dimethylaniline dihydrochloride in methylene chloride was added to inactivate excess ammonia.

At 0°C., 41.9 g. of D(-)phenylglycycl chloride hydrochloride was added portionwise over 20 minutes. After warming to 10°C. and stirring for an additional 15 minutes, the mixture was poured into 1,200 ml. of ice-water and then the procedure of Example 1, D and E, was followed. The yield of anhydrous ampicillin was 56.0 g. or 80 percent of theory.

EXAMPLE 15

Methyl hydrogen dichlorosilane (23.0 g.; 0.20 mole) was added dropwise at 13°-15°C. to a mixture of 43.2 g. of 6-APA, 44.5 g. of triethylamine, and 450 ml. of dry methylene chloride with stirring. After heating at 38°C. for 30 minutes, the mixture was cooled and 23 ml. of a 1.3 molar solution of dimethylaniline dihydrochloride in methylene chloride and 26.7 g. of N,N-dimethylaniline were added.

Then, 41.3 g. of D(-)phenylglycyl chloride hydrochloride was added portionwise at 0°C. and the mixture was stirred for 1½ hours at 0°-10°C. After pouring the entire mixture into 1,200 ml. of cold water and stirring at 10°C. for 15 minutes, a small amount of insoluble matter was removed by filtration. Treatment of the two-phase mixture with ethyl acetate and then with β-naphthalenesulfonic acid as described in Example 1 D afforded 77.5 g. (dry basis) of the β-naphthalenesulfonic acid salt of ampicillin or 70 percent of theory.

Following an identical procedure except omitting the addition of the dimethylaniline dihydrochloride, the yield was 63.5 g. or 57 percent of theory.

EXAMPLE 16

PREPARATION OF AMPICILLIN TRIHYDRATE

In a 1 liter 3-neck flask fitted with stirrer, thermometer, and reflux condenser with soda-lime drying tube, a mixture of 43.2 g. of 6-APA, 25.8 g. (0.16 mole) of hexamethyldisilazane, and 435 ml. of methylene chloride was heated at 40°-41°C. for two hours. After allowing the turbid solution to cool, 29.1 g. of N,N-dimethylaniline and 8 ml. of a 1.3 molar solution of dimethylaniline dihydrochloride in methylene chloride were added. Then, 42.0 g. of D(-)phenylgylcyl chloride hydrochloride was added in portions at 0°C., and reaction was completed by warming slowly to 10°C. and stirring 15 minutes at 10°C.

The mixture was poured into 750 ml. of ice-water with stirring, filtered, and the methylene chloride layer discarded. After adjusting the aqueous phase to pH 5.0 with 79 ml. of 5 N sodium hydroxide, the mixture was allowed to stir overnight at 0°-5°C. The white, crystalline product was collected by filtration, washed with isopropanol-water, and dried at 45°C. The yield of ampicillin trihydrate was 65.0 g. or 80 percent of theory; purity by iodometric assay, 100 percent.

In an identical experiment in which the addition of N,N-dimethylaniline dihydrochloride was omitted, the yield was 22.7 g. or 28 percent of theory.

EXAMPLE 17

A mixture of 46.4 g. (0.214 mole) of 6-APA, 24.3 g. (0.15 mole) of hexamethyldisilazane, and 420 ml. of methylene chloride was heated under reflux for 3 hours with stirring allowing ammonia to escape. After cooling and clarifying the solution by pressure filtration, 26.7 g. of N,N-dimethylaniline was added, and 0.4 g. of anhydrous hydrogen chloride was passed into the mixture.

At 0°-5°C., 42.1 g. of D(-)phenylgylcyl chloride hydrochloride was added in portions and then the mixture was warmed slowly and allowed to stir at 10°C. for one-half hour. After pouring the mixture into 1,200 ml. of ice-water, filtering, and discarding the methylene chloride phase, the procedure of Example 1, D and E, was followed. The yield of ampicillin anhydrous was 60.8 g. or 81 percent of theory based on 6-APA.

EXAMPLE 18

To 43.2 g. (0.20 mole) of 6-aminopenicillanic acid and 425 ml. of methylene chloride in a dry 1 liter 3-neck flask fitted with stirrer, thermometer, and nitrogen inlet, 58.2 g. (0.40 mole) of trimethylsilyldiethylamine was added. After stirring the mixture under reflux (43°C.) for 1 hour, methylene chloride was allowed to distill off until 300 ml. of distillate had been collected in 1 hour. Titration of the distillate indicated that 0.14 mole of diethylamine had been removed in the distillation. The pale yellow reaction mixture was cooled, diluted with 300 ml. of methylene chloride, and 31.5 g. of N,N-dimethylaniline added.

After adding 100 ml. of a 1.55 molar solution of N,N-dimethylaniline dihydrochloride in methylene chloride, 41.3 g. of D(-)phenylglycyl chloride hydrochloride was added portionwise over 20 minutes at 0°C. The mixture was allowed to stir at 0°C. for 15 minutes, then at 10°C. for 15 minutes, and finally was poured into 1,200 ml. of ice-cold water with stirring. After clarifying the two-phase mixture by filtration, 150 ml. of ethyl acetate was added followed by β-naphthalenesulfonic acid analogous to the procedure of Example 1, D and E. The yield of ampicillin anhydrous was 55.7 g. of 80 percent of theory; iodometric assay, 986 mcg. per mg.; bioassay, 927 mcg. per mg.

Following the same procedure except omitting the addition of N,N-dimethylaniline dihydrochloride, the yield was 32 percent of theory.

EXAMPLE 19

The procedure of Example 18 was followed except that methylene chloride was distilled off until the temperature reached 49°C. The distillate (350 ml.) contained 0.17 mole of diethylamine by titration. In this experiment, the excess diethylamine was inactivated by adding pyridine hydrochloride in place of dimethylaniline dihydrochloride. The yield of ampicillin anhydrous was 50.9 g. or 73 percent of theory; bioassay, 983 mcg. per mg.

EXAMPLE 20

The procedure of Example 18 was followed except that the mixture was allowed to reflux for two hours, no diethylamine was removed by distillation, and 125 ml. of a 1.6 molar solution of N,N-dimethylaniline dihydrochloride in methylene chloride was used. The over-all yield of ampicillin anhydrous was 57.5 g. or 82 percent of theory; bioassay, 987 mcg. per mg.

EXAMPLE 21

Utilizing the procedure of Example 6, tri-n-butylchlorosilane (94 g.; 0.40 mole) was substituted for trimethylchlorosilane, and the amount of triethylamine was increased to 42.6 g. Sixteen ml. of a 2.6 N solution of dimethylaniline dihydrochloride in methylene chloride was added prior to the phenylglycyl chloride hydrochloride which was added at 0°C. and allowed to react at 15°–20°C. for 30 minutes. The yield of the β-naphthalenesulfonic acid salt of ampicillin was 87 percent of theory.

Following the above procedure with tri-ethylbromosilane (78 g.) as silylating agent, the yield of the intermediate salt of ampicillin was 92 percent of theory.

The use of diphenylmethylchlorosilane (93 g.) in an analogous procedure afforded an 85 percent yield of the β-naphthalene-sulfonic acid salt of ampicillin.

EXAMPLE 22

Methylpropyldichlorosilane (15.7 g; 0.10 mole) was added dropwise at 10°–15°C. to a mixture of 21.6 g. of 6–APA, 21.2 g. of triethylamine, 13.4 g. of N,N-dimethylaniline, and 230 ml. of methylene chloride with stirring. After heating at reflux for 2 hours, the mixture was cooled and 6 ml. of a 2.6 N solution of dimethylaniline dihydrochloride in methylene chloride was added.

After adding 21.3 g. of D(-)phenylglycyl chloride hydrochloride portionwise at 0°C., the mixture was allowed to stir at 10°C. for 1½ hours. The pale yellow reaction mixture was poured into 600 ml. of ice-water, the mixture clarified by filtration and the layers separated. Treatment of the aqueous layer with β-naphthalenesulfonic acid as described in Example 1 D afforded the β-naphthalenesulfonic acid salt of ampicillin, 49.6 g. or 89 percent of theory.

EXAMPLE 23

Following the procedure of Example 22, methylphenyldichlorosilane (19.1 g.; 0.10 mole) was substituted for methylpropyldichlorosilane and 8 ml. of 2.6 N dimethylaniline dihydrochloride was used for inactivation of the excess amine. The yield of the β-naphthalenesulfonic acid salt of ampicillin was 45 g. or 81 percent of theory.

I claim:

1. A method of preparing a silylated, or silenated, acid chloride salt of a penicillin of the group having one of the three following formulas I., IA., and II., respectively:

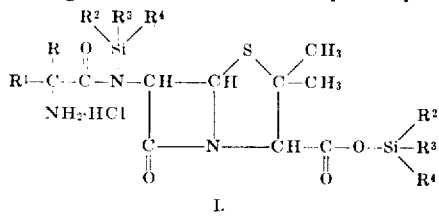

I.

wherein, when R and R¹ are separate, R is hydrogen and R¹ is phenyl, and when R and R¹ are joined, they complete a ring selected from the group consisting of cycloalkyl of from four to seven carbon atoms, and indane; and R², R³ and R⁴ are each selected from the group consisting of lower alkyl and phenyl, lower alkylphenyl and benzyl;

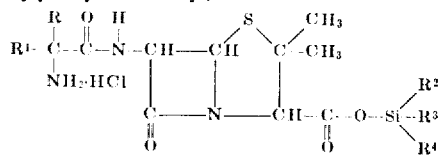

IA.

wherein, R, R¹, R², R³ and R⁴ have the same meaning as in formula I.; and

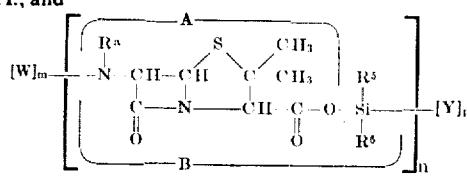

II.

wherein:
R⁵ is of the group consisting of hydrogen, lower alkyl, phenyl, lower alkylphenyl and benzyl;
R⁶ is of the group consisting of halo, lower alkyl, phenyl, lower alkylphenyl and benzyl;
R" is of the group consisting of those having the formula:

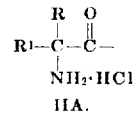

IIA.

wherein R and R¹ have the same meaning as in formula I above;
W is of the group consisting of hydrogen and

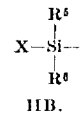

IIB.

wherein R⁵ and R⁶ have the same meaning as in formula II., and X is halogen;
m is an integer from 0 to 1;
n is an integer from 1 to about 25;
p is an integer from 0 to 1;
Y is of the group consisting of halogen and groups of the following formula:

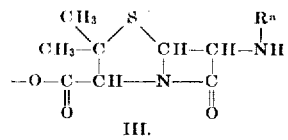

III.

wherein R" has the same meaning as before;
with the provisos that, in formula II.,
1. when m is 0 and p is 0, n is more than 1;
2. when n is more than 1, the moieties A of the additional groups B recur in random head-toward-head, head-toward-tail and tail-toward-tail disposition; and
3. m is always equal to p.

which method comprises following one of the two sequences of steps (A) or (B) given below:

(A)
1. preparing a mixture of 6-aminopenicillanic acid, a strong amine, and a weak amine, in an organic solvent devoid of hydroxyl groups;
2. incorporating in said mixture a mono- or multifunctional halosilane;
3. also incorporating in said mixture, a mineral acid salt of a weak amine; and thereafter
4. adding to the resulting mixture, an organic acid chloride hydrochloride of the group having the formula:

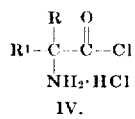

IV.

wherein R and R¹ have the same meaning as in formula I above; and wherein:
in 1. the molar ratio of said strong amine per mole of 6-aminopenicillanic acid is in the range of from 1.1 to about 2.5 moles; and that of said weak amine is in the range of from 0.75 to 1.25 moles per mole of 6-aminopenicillanic acid;
in 2. said halosilane is added to said mixture in amount so that the molar ratio of said halosilane, if mono-functional, is in the range of from about 1 to about 2 moles per mole of 6-aminopenicillanic acid, and, if multifunctional, is in the range of from about ½ to about 2 moles, with the molar amount of said strong amine, in either case, at least equal to the molar amount of said halosilane;

in 3. said mineral acid salt of a weak amine is incorporated in an amount to furnish mineral acid at least in molar concentration equivalent to the molar concentration of said strong amine present in excess of that consumed in the silylation or silenation reaction; and in 4. said organic acid chloride hydrochloride is added in amount to provide a molar ratio of 0.75 to 1.25 per mole of 6-aminopenicillanic acid;

with the provisos that:

a. when the halosilane selected is monofunctional, a disilylated acid chloride salt of a penicillin of formula I. is obtained, and b. when the halosilane selected is multifunctional, a silenated acid chloride salt of a penicillin of formula II. is obtained; or (B)

1. preparing a mixture of 6-aminopenicillanic acid and a silylating agent selected from the group consisting of trialkylsilyldialkylamines and hexaalkyldisilazanes, in an organic solvent devoid of hydroxyl groups;
2. heating said mixture until silylation is complete;
3. incorporating in the mixture, a weak amine;
4. adding to the resulting mixture, a mineral acid salt of a weak amine; and
5. treating the final mixture with an organic acid chloride hydrochloride of the group having the formula IV. above; and wherein:

in 1., when a trialkylsilyldialkylamine is selected, it is added in amount so that the molar ratio thereof is in the range of from about 1 to about 2.2 moles per mole of 6-aminopenicillanic acid; and when a hexaalkyldisilazane is selected, it is added in amount so that the molar ratio thereof is in the range from about 0.6 to about 1.0 mole per mole of 6-aminopenicillanic acid; and in 3., the molar ratio of weak amine incorporated in the mixture is in the range of from about 0.75 to 1.25 moles per mole of 6-aminopenicillanic acid;

in 4., said mineral acid salt of a weak amine is incorporated in an amount to furnish mineral acid in at least molar concentration to inactivate the by-product alkylamine or ammonia furnished in the silylation reaction; and in 5., said organic acid chloride hydrochloride is added in amount to provide a molar ratio of 0.75 to 1.25 moles per mole of 6-aminopenicillanic acid;

with the provisos that:

a. when the silylating agent selected is a trialkylsilyldialkylamine, a disilylated acid chloride salt of a penicillin of formula I. above is obtained; and b. when the silylating agent selected is a hexaalkyldisilazane, the silylated acid chloride salt of a penicillin obtained is selected from the group consisting of those having the formulas I. and IA., and mixtures thereof.

2. A method of preparing a silylated or silenated, acid chloride salt of a penicillin, as defined in claim 1, wherein: the organic solvent devoid of hydroxyl groups is selected from the group consisting of methylene chloride, chloroform, tetrahydrofuran, dimethyl formamide, and acetonitrile.

3. A method of preparing a silylated or silenated acid chloride salt of a penicillin, as defined in claim 2, wherein: the strong amine selected or furnished, is of the group consisting of ammonia, diethylamine, triethylamine, dioctylamine, and 2,2'-diethyl-dihexylamine.

4. A method of preparing a silylated or silenated acid chloride salt of a penicillin, as defined in claim 3, wherein: the weak amine is selected from the group consisting of N,N-dimethylaniline, quinoline, and pyridine.

5. A method of preparing a silylated acid chloride salt of a penicillin of formula I., as defined in claim 4, wherein: the silylating agent is trimethylchlorosilane.

6. A method of preparing a silenated acid chloride salt of a penicillin of formula II., as defined in claim 4, wherein: the silylating agent is dimethyldichlorosilane.

7. A method of preparing a silylated acid chloride salt of a penicillin of formula I., as defined in claim 2, wherein: the silylating agent is timethylsilyldi-ethylamine.

8. A method of preparing a silylated acid chloride salt of a penicillin of formula I. or IA., or mixtures thereof, as defined in claim 2, wherein: the silylating agent is hexamethyldisilazane.

9. A method of preparing a silylated or silenated, acid chloride salt of a penicillin, as defined in claim 4, wherein: the acid salt of a weak amine is N,N-dimethylaniline hydrochloride.

10. A method of preparing a silylated or silenated, acid chloride salt of a penicillin, as defined in claim 4, wherein: any excess strong amine is inactivated and the weak amine hydrochloride is formed in situ, by passing anhydrous hydrogen chloride into the mixture containing the strong amine and the weak amine.

11. A method of preparing a silylated or silenated, acid chloride salt of a penicillin, as defined in claim 4, wherein: the organic acid chloride hydrochloride is selected from the group consisting of D(-)-phenylglycyl chloride hydrochloride, 1-amino-1-cyclohexane carboxylic acid chloride hydrochloride and 2-amino-2-carboxyindane acid chloride hydrochloride.

12. A method of preparing a silylated or silenated derivative of 6-aminopenicillanic acid in a reaction medium suitable for use in subsequent procedures for preparing penicillin derivatives, which method comprises:

preparing a mixture of 6-aminopenicillanic acid, a strong amine, a weak amine and a mono- or multifunctional halosilane in an organic solvent devoid of hydroxyl groups, in molar ratios of in excess of 2 moles of strong amine, from 0.75 to 1.25 moles of a weak amine, and from about 1 to about 2 moles of said halosilane per mole of 6-aminopenicillanic acid when a monofunctional halosilane is used, and from about ½ to about 2 moles of said halosilane per mole of 6-aminopenicillanic acid when a multifunctional halosilane is used; then incorporating therein mineral acid salt of a weak amine in amount to provide a molar concentration thereof at least equivalent to the excess of that consumed in the silylation or silenation reactions.

13. A method of preparing a silylated derivative of 6-aminopenicillanic acid, as defined in claim 12, wherein:

a monofunctional halosilane is used in amount to afford from about 1.75 to 2.0 moles thereof per mole of 6-aminopenicillanic acid.

14. A method of preparing a silylated derivative of 6-aminopenicillanic acid, as defined in claim 12, wherein:

a multifunctional halosilane is used in amount to afford from about 0.8 to about 1.2 moles thereof per mole of 6-aminopenicillanic acid.

15. A method of preparing a derivative of 6-aminopenicillanic acid in a reaction medium suitable for use in subsequent procedures for preparing penicillins which method comprises:

preparing a mixture of 6-aminopenicillanic acid and a silylating agent selected from the group consisting of trialkylsilyldialkylamines and hexaalkyldisilazanes, in an organic solvent devoid of hydroxyl groups, so that, when a trialkylsilyldialkylamine is selected, it is present in amount to provide a molar ratio thereof in the range from about 1 to about 2.2 moles per mole of 6-aminopenicillanic acid, and when a hexaalkyldisilazane is selected, it is present in amount to provide a molar ratio thereof in the range from about 0.6 to about 1.0 mole per mole of 6-aminopenicillanic acid, heating said mixture until silylation is complete, incorporating in the mixture, a weak amine, in amount to provide a molar ratio of from about 0.75 to 1.25 moles thereof per mole of 6-aminopenicillanic acid, and then incorporating into the resulting mixture a mineral acid salt of a weak amine in at least molar concentration to inactivate the byproduct alkylamine or ammonia furnished in the silylation reaction.

16. A method of preparing a silylated derivative of 6-aminopenicillanic acid, as defined in claim 15, wherein: the silylating agent is trimethylsilyldiethylamine.

17. A method of preparing a silylated derivative of 6-aminopenicillanic acid, as defined in claim 15, wherein: the silylating agent is hexamethyldisilazane.

* * * * *